C. N. ALLERDING.
VALVE.
APPLICATION FILED JULY 7, 1910.
1,048,635.
Patented Dec. 31, 1912.
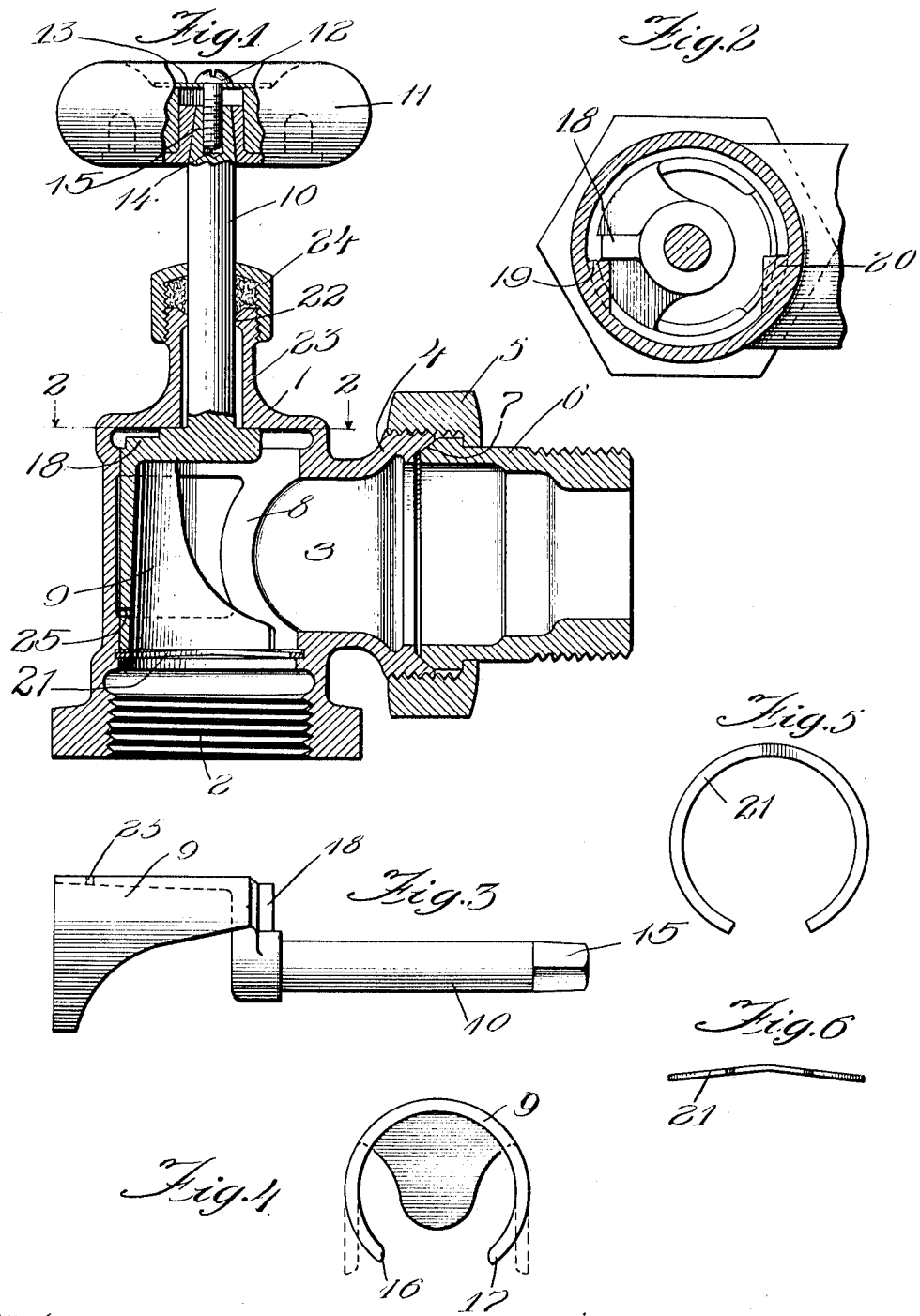
Witnesses:
Ira D. Perry
A. O. Knight.
Inventor:
Cletus N. Allerding.
By Brown & Hopkins
Attys

UNITED STATES PATENT OFFICE.

CLETUS NICHOLAS ALLERDING, OF MANSFIELD, OHIO, ASSIGNOR TO THE OHIO BRASS COMPANY, OF MANSFIELD, OHIO, A CORPORATION OF NEW JERSEY.

VALVE.

1,048,635.  Specification of Letters Patent.  Patented Dec. 31, 1912.

Application filed July 7, 1910. Serial No. 570,714.

*To all whom it may concern:*

Be it known that I, CLETUS N. ALLERDING, a citizen of the United States, residing at Mansfield, in the county of Richland and State of Ohio, have invented certain new and useful Improvements in Valves, of which the following is a specification.

This invention relates to valves, and has for its primary object to provide an improved construction, combination and arrangement of parts in a valve according to which an efficient and durable valve can be simply and economically manufactured.

One of the objects of the present invention is to provide an improved rotary valve for heating systems and like purposes.

Another object is to provide improved bearing connections between the valve and the housing.

Another object is to provide an improved method of manufacturing the valves.

Another object is to provide an improved construction for valves whereby the valve and valve chamber will be kept thoroughly drained.

Other and further objects will appear in the specification and be specifically pointed out in the appended claims, reference being had to the accompanying drawings exemplifying the invention, and in which—

Figure 1 is an axial section through the valve and housing, parts being shown in section. Fig. 2 is a section on the line 2—2 of Fig. 1. Fig. 3 is a view in elevation of the valve and stem piece removed from the housing. Fig. 4 is a bottom end view of the valve and stem piece shown in Fig. 3, the original positions of the yielding parts of said valve being shown in dotted lines. Fig. 5 is a plan view of a resilient ring for retaining the valve within the housing. Fig. 6 is an elevation of the ring shown in Fig. 5.

Referring more specifically to the drawings, and to the embodiment of the invention shown therein, the valve housing consists preferably of a body portion 1, open at one end to provide an inlet 2 which is threaded, as shown, for making a pipe connection. Said body portion 1 is made in one piece, being what is commonly termed a bonnetless valve. Angularly disposed with reference to the axis of the inlet 2 is an outlet passage 3 in a protruding portion 4 of the valve housing or body 1. The protruding portion 4 is provided exteriorly with screw threads for the reception of a union nut 5, which engages a shoulder on a tail piece 6, enabling said tail piece 6 to be drawn into a close joint at 7 with the valve housing 1. The tail piece 6 is adapted to be used in a well known manner for connecting up the valve with the radiator, or any other connection with which it is desired to use the valve. As shown best in Fig. 1, the interior cylindrical surface of the valve housing 1 is provided with raised cylindrical bearing surfaces 8, which is adapted to rotatably mount a cylindrical valve body 9, which is provided exteriorly with a cylindrical bearing surface for that purpose. The cylindrical body portion 9 is cut away on one side to provide a port or opening in the lateral wall thereof. Adjacent said port or opening, the cylindrical wall is tapered to form yielding projecting portions 16 and 17 which exert a resilient pressure against the bearing surfaces 8. Integral with the valve body 9 is a valve stem 10, which, when in position within the housing, extends upwardly through an aperture in the upper end of said housing 1. In order to provide means for permitting the insertion of the valve body 9 and valve stem 10, a handle 11 is releasably secured to the upper end of the valve stem 10 in a well known manner, preferably by means of a screw 12 in engagement with a disk 13 in the handle 11, said screw 12 being threaded into a tapped hole 14 in the upper end of the valve stem 10. The handle 11 is held against turning on the valve stem 10 by providing the outer end of said valve stem with a squared extremity 15 fitting a square socket in the handle 11. The inlet opening 2 is in coaxial alinement with the valve stem 10 when in position, and is made sufficiently large to permit the valve body 9 to be moved into and out of position within the housing 1 therethrough when the handle 11 is removed from the valve stem.

The method of manufacturing the valve and stem piece will be understood from an inspection of Figs. 3 and 4. When the casting shown in these figures is withdrawn from the mold, the projecting yielding portions 16 and 17 project parallel to each other from one end of the casting, as shown in dotted lines in Fig. 4, the parting surface of a two part mold being arranged to include the axis of the valve stem 10 in the position shown in Fig. 3, and to conform to the exterior cylindrical surface of the hollowed valve body 9. It will thus be seen by reference to Fig. 4, that when the points 16 and 17 are in the position shown in dotted lines in said figure, the casting is symmetrical with respect to a vertical plane through the axis of the valve stem 10 and is so constructed and provided with draft on those portions protruding beyond the horizontal plane through the axis of said stem 10 that the pattern for forming the mold may be readily withdrawn from the sand or material from which the mold is made. After the casting has been withdrawn from the mold, the points 16 and 17 are bent into the form shown in Fig. 4 to conform with the remainder of the body portion 9, and the valve stem and body are then inserted in the machine and the exterior cylindrical surface thereof finished. As shown best in Fig. 2, the body portion 9 is cut away adjacent the valve stem 10 in such a manner as to permit ready drainage of the upper portions of the housing 1, and the parts of the valve adjacent thereto. A radially disposed nib or lug 18 cast solid with the body portion 9 is adapted to limit the rotary movement of the valve body by abutting successively against lugs 19 and 20 integrally formed with the wall of said housing 1. In order to provide efficient means for retaining the gate valve and stem within the housing 1, said housing is provided adjacent the inlet opening 2 with an annular groove for the reception of a resilient member in the form of a spring ring 21, said ring being preferably provided by cutting a single convolution from a helical spring of flat wire and bending it into the shape shown in Fig. 6. This spring ring 21, by reason of the shape imparted to it, is adapted after it has been inserted in said annular groove, to impart an upward pressure on the body portion 9 in such manner as to secure a close joint between the valve housing 1 and the valve body 9, and it also assists in holding the valve against turning. Before the valve 9 is inserted into the housing 1, the yielding portions 16 and 17 (see Fig. 4) are spread slightly so as to press closely against the bearing surface 8 to resiliently hold the valve against turning. The valve stem 10 is rotatably supported above in a bearing 22 provided at the upper end of an extended portion 23 of the housing 1. To prevent leakage around the valve stem at the upper end of the housing, the bearing portion 22 is threaded exteriorly to receive a packing nut 24.

The operation of the valve is apparent, but briefly stated, it is as follows: When the handle 11 is turned about the axis of the stem 10, the gate 9 may be revolved into a position to close the outlet passage 3 in which position the lug 18 abuts against the stop or lug 20. When the gate 9 is in the position shown in Figs. 1 and 2, however, with the lug 18 in abutment with the stop or lug 19, the outlet passage 3 is opened to permit the passage of the fluid through the valve. A small perforation 25 is provided in the gate 9 for the purpose of draining the water or other fluid from a radiator when the valve is closed, said perforation being too small to permit the circulation of water through the radiator.

What I claim is:

1. A valve comprising a cylindrical housing with an end opening and a side opening, an integral valve and valve stem, the valve stem protruding through the end of the housing opposite to the end opening, and a spring ring positioned in the open end of the housing and operative to hold the valve in the housing and to press it against the closed end thereof, portions of the said valve being cut away forming resilient extensions to retain the valve closely in longitudinal position in the housing.

2. An angle valve comprising a cylindrical housing with an end opening and a side opening, the other end being formed with a reduced valve stem extension, and the interior portion of the open end being hollowed out to form an annular shoulder, an integral valve and stem formed with a bearing surface to engage the end of the housing around the stem opening, and a spring ring abutting the said shoulder and the end of the valve to hold the said bearing surface in position against the end of the housing, thereby to close the valve stem opening.

3. An angle valve comprising a cylindrical housing with an end groove and a lateral opening, the interior portion of the open end having an annular opening, and formed with a reduced valve stem extension and opening at the closed end, a valve with an integral valve stem to protrude from the said extension, the body of the valve fitting the interior of the housing and bearing against the closed end around the valve stem opening to close the said extension opening, a packing nut to surround the valve stem and secured to the said valve stem extension, and a flat spring ring seated in the annular groove operative to press the valve body against the closed end of the housing.

In testimony whereof I have signed my name to this specification, in the presence of two subscribing witnesses, on this 2nd day of July, A. D. 1910.

CLETUS NICHOLAS ALLERDING.

Witnesses:
J. ROWLAND BROWN,
WILLARD H. KEMPTON.